March 12, 1935.  V. ROCCHI  1,994,111
APPARATUS FOR MANUFACTURING TUBES FROM STEEL
Filed July 22, 1932  4 Sheets-Sheet 1
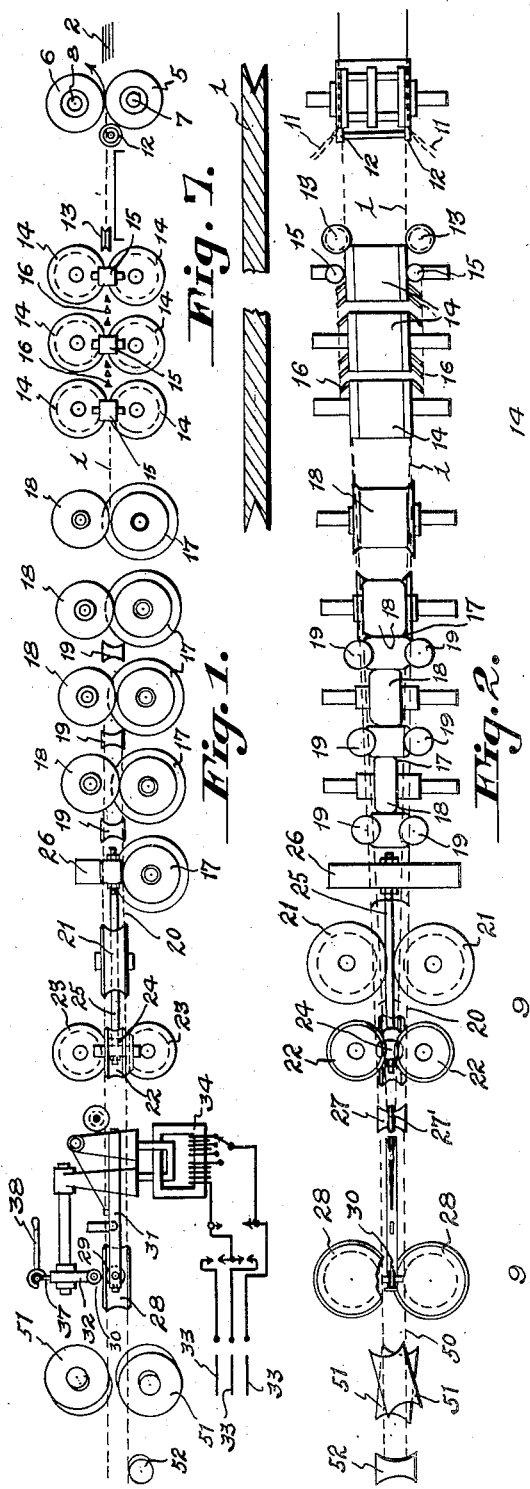
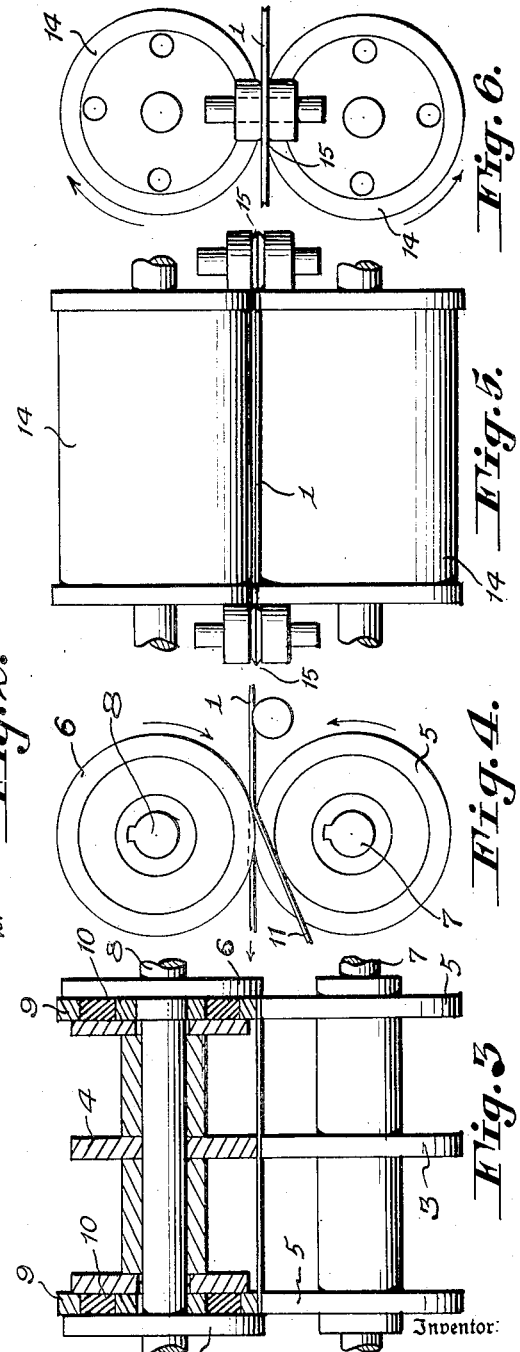
Inventor:
V. Rocchi
By Glascock Downing & Seebold
Attorney

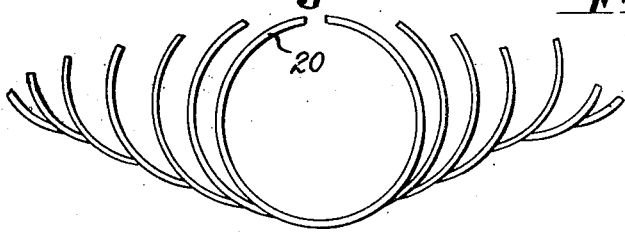
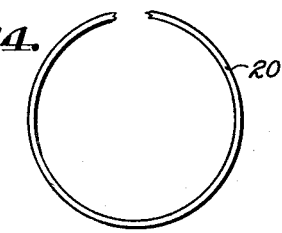
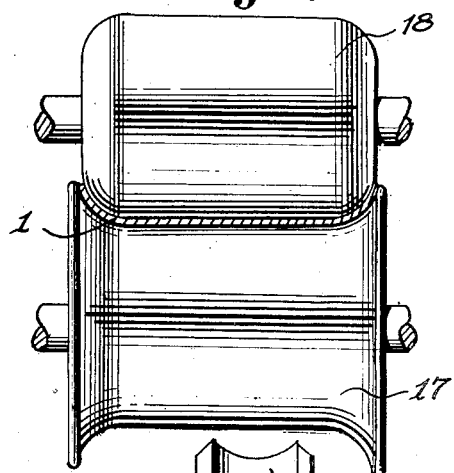
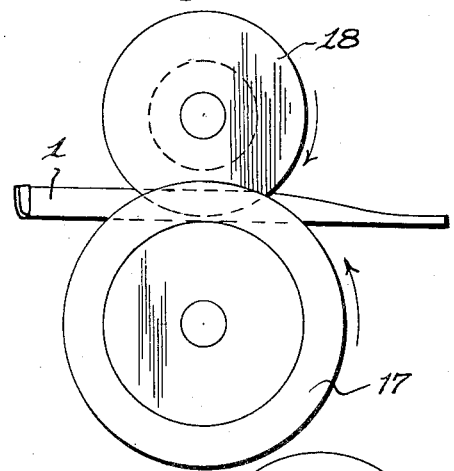
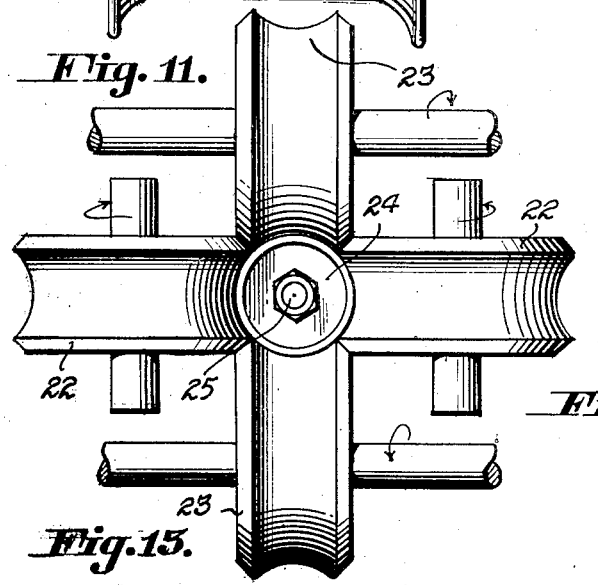
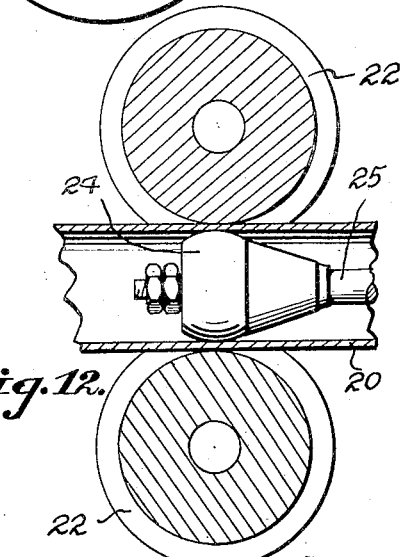
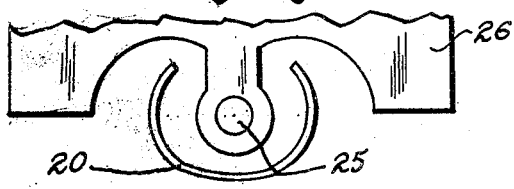

March 12, 1935.  V. ROCCHI  1,994,111
APPARATUS FOR MANUFACTURING TUBES FROM STEEL
Filed July 22, 1932  4 Sheets-Sheet 3
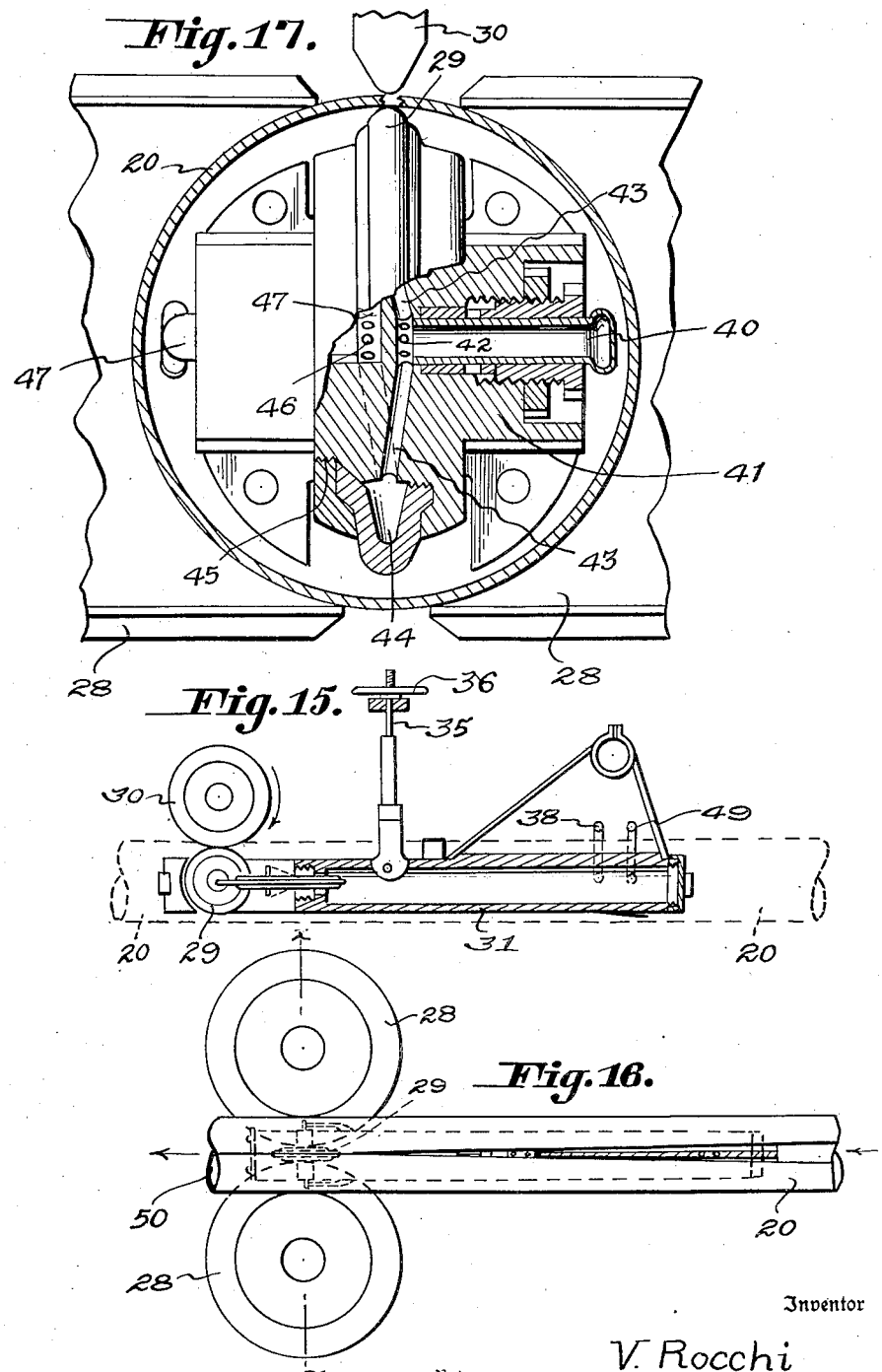

March 12, 1935.  V. ROCCHI  1,994,111
APPARATUS FOR MANUFACTURING TUBES FROM STEEL
Filed July 22, 1932   4 Sheets-Sheet 4
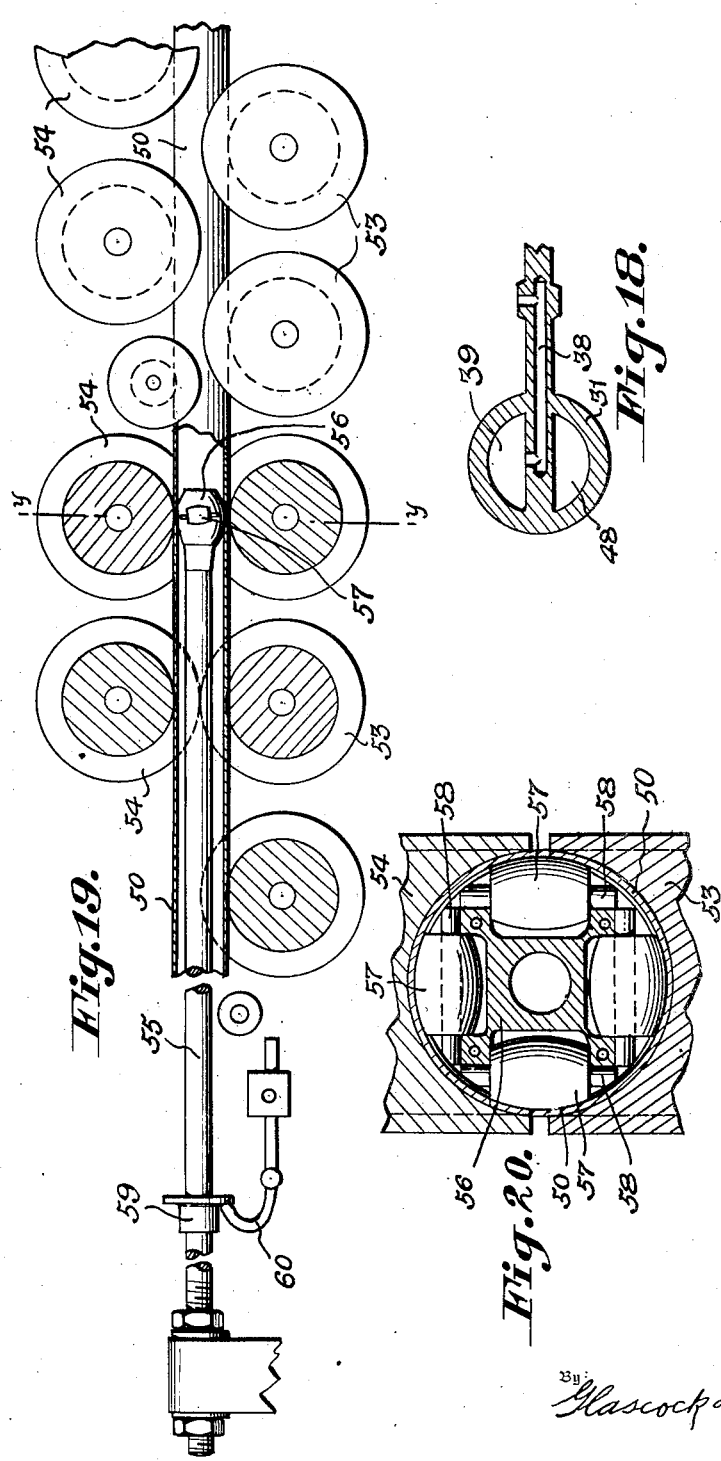
Inventor:
V. Rocchi
By Glascock Downing & Seebold
Attorney Patented Mar. 12, 1935

1,994,111

UNITED STATES PATENT OFFICE 1,994,111

APPARATUS FOR MANUFACTURING TUBES FROM STEEL

Vittorio Rocchi, Milan, Italy

Application July 22, 1932, Serial No. 624,137
In Germany July 23, 1931

2 Claims. (Cl. 219—6)

The present invention has for its objects the provision of mechanism for carrying out a process and for manufacturing tubes from sheet metal of any desired metallic alloy and particularly of soft steel, the resulting tubes being welded along their central seam line and having regular and exactly calibrated cross sections through their entire length.

The said process, but for the thermoelectric heating of the tube edges during the electric welding of the tube, is carried out in a cold state, and is mainly characterized by the fact that the metal sheet and the tube being machined are submitted to a continuous travel through a series of rolling mills, during which travel the several processes are carried out which are necessary to transform the metal sheet into a tube calibrated throughout its entire length.

The said processes are as follows:

(1) A shearing of the two sheet edges to give to the sheet the desired width;

(2) A sutiable shaping of the two sheet edges in order to obtain a better mortise of the same through the electric welding;

(3) A gradual bending of the sheet to shape it into the form of a tube;

(4) The welding of the mortised tube edges;

(5) The rolling and calibrating of the welded tube.

The whole working process is carried out on five consecutive rolling mills forming with their working mechanisms five different machines through which the sheet metal first and then the tube are successively displaced during the development of the process itself. In these five machines the rolling mills have the double task of controlling and guiding the forward movement of the sheet and tube and of co-operating with the operating mechanisms to transform the said tube in the desired manner.

More particularly, between the rollers through which the sheet metal or the tube passes and the operating mechanisms there is a close functional correlation, so that the work of these mechanisms is completed by the movement of the rollers.

To this close functional correlation are mainly due the excellent results which have been obtained by means of the present working process.

It is to be understood that there is no necessity of placing the different machines one after the other in a single installation. They may be each separated from each other or collected in groups, but with a separation of this kind there arises the necessity of the transport of the blank from each machine to the next one, this form however is generally the preferred one owing to the fact that it permits the location of each machine in its best working conditions.

The invention will be readily understood by referring to the annexed drawings, which show, by way of an example, one of the possible forms of execution of this invention.

According to these drawings:

Figs. 1 and 2 show respectively a schematical side elevation and a plan view of the several machines intended to perform one after the other all the stages necessary to the manufacture of the tube. The said machines are shown in these figures as placed one after the other in a single unit only for sake of convenience.

Figs. 3 and 4 show respectively a front view partly in cross section and a side view of the first machine of the series, to wit: of the double sheet shearing machine having the object of shearing the two side edges of the metal sheet.

Figs. 5 and 6 show respectively a front view and a side view of the second machine intended to shape into a suitable form the sheet edges whilst Fig. 7 shows a cross-section of a metal sheet, partly broken away, after the shaping process.

Figs. 8 and 9 show respectively a front view and a side view of the first part of the sheet folding or bending machine for shaping the sheet into the form of a tube, the bending being effected gradually on the successive parts of the sheet, as represented by the scheme of Fig. 10.

Figs. 11 and 12 show respectively a front view and a horizontal section of the last part of the bending machine, in which the rollers through which the tube passes cooperate with an adjustable mandrel placed inside the tube.

Fig. 13 is a front view of a detail of the supporting beam for the mandrel.

Fig. 14 shows the tube as discharged from the machine and before being submitted to the welding process.

Figs. 15 and 16 show respectively a longitudinal section and a plan view of the welding machine.

Fig. 17 shows in a larger scale a front view of the welding machine partly in section through the line $x$—$x$ of Fig. 16.

Fig. 18 is a sectional view of the cooling water feed apparatus for the lower electrode of the welding machine.

Fig. 19 is a front view of the rolling mill for equalizing and calibrating the manufactured tube.

Fig. 20 shows in a larger scale a cross section taken along the line $y-y$ of Fig. 19 of the mandrel working inside the tube, to cooperate with the external rollers of the rolling mill.

Fig. 21 is a longitudinal sectional view of a rolling mill of a different form of execution.

By referring to the drawings, the metal sheet 1 taken from the sheets pile 2, passes between the rollers 3 and 4 of the double shearing machine comprising the two lower circular knives 5 and the two upper circular knives 6, disposed on the shafts 7 and 8 respectively on which the rollers 3 and 4 are mounted.

The shearing machine shears with a straight cut both sides of the sheet, this being made possible by the fact that the sheet is tightly kept against the lower knives 5 by means of two pressing rollers, formed by metal rings 9 disposed on rings 10 of hardened gum or other elastic material, which last permit to the rollers 9 to rise to the required height to permit the sliding movement of the sheet yet always keeping the same tightly pressed against the knives 5. The sheet is so cut to the desired width, whilst the lateral strips 11 fall away, and is carried by the rollers 12 and 13 to the edges shaping machine comprising the conveying rollers 14 provided with horizontal shafts, and the milling rollers 15 provided with vertical shafts, these last being eventually totally or partly substituted by the knives 16. When the sheet leaves this machine it is provided with shaped edges, as shown in Fig. 7.

From the edge shaping machine, the sheet passes to the folding or bending machine, comprising the lower rollers 17 of progressively decreasing width and of suitable shape which act as shaping rollers, and the upper counter-rollers 18 which act as pressure rollers and push the sheet against the rollers 17 of which the metal sheet takes up the shape. The sheet is therefore bent little by little, as shown in Fig. 10, while it is vertically guided by the rollers 19, having vertical axle. In the last part of the bending machine, the tube 20 nearly closed after passing between the two rollers 21 having vertical shafts is surrounded by the two rollers 22 having vertical shafts and by the two rollers 23 having horizontal shafts and is subjected to the internal action of the mandrel 24 which with its peripheral convexed surface presses the said tube 20 tangentially against the rollers 22 and 23 to impart uniform cross-area to the tube throughout its length. The mandrel 24 is carried by the stem 25 supported by the beam 26 connected with the machine frame. With the aid of this mandrel thin walled tubes may be produced having a large diameter and characterized by a great regularity of form.

The tube 20 is drawn out from the bending machine still somewhat in an open state, as shown in Fig. 14, and while it is guided by the roller 27, the flange 27' thereof enters the longitudinal slot in the tube and the latter is carried to the welding machine which closes the tube and solders its edges. The welding machine comprises the adjustable closing rollers 28 having vertical shafts, which externally surround the tube and cause it to close, and the two small rollers 29 and 30 with horizontal axles, forming respectively the lower and the upper electrode, the former of which is disposed inside the tube. The two electrodes are respectively carried by the arms 31 and 32 acting as electrical conductors to which the current is carried from a line 33 through the transformer 34. The welding process is of the type based on the ohmic resistance in spots or continuously. To adjust the pressure of the lower electrode 29 on the tube, a threaded bar 35 is provided, which is connected with the arm 31 and provided with the handwheel 36. The pressure of the electrode 30 is adjusted by means of the bar 37 operated by the lever 38. The cooling of the electrodes has been carefully attended to, and it is obtained by means of water circulation inside the electrodes. For the lower electrode the water enters through the pipe 38, into the passage 39 of the arm 31, passes therefrom into the small tube 40 provided in the electrode-spindle 41 and hence through the outlets 42 into the ducts 43, leading through the electrode-holder 41 to the annular chamber of the electrode 44. From this chamber the water returns back through the ducts 45, the openings 46, the little tube 47, the chamber 48 and the discharge pipe 49.

The cooling of the upper electrode 30 is accomplished in the same way, but through a shorter distance, due to the fact that the water does not pass through the electrode supporting arm, which is separately cooled. With reference to this welding machine it may be observed that it is not absolutely necessary to provide the two tube closing rollers 28 which only serve to save some work to the operator of the machine. From the welding machine the welded tube 50 passes through the guiding rollers 51 and 52 to the regularizing and calibrating rolling mill, formed, as shown in Fig. 19, by a series of lower rollers 53 and of upper rollers 54, which surround the tube and cause it to slide along the rolling mill.

With the said rollers 53—54 coacts a mandrel carried by the bar 55 and disposed inside the tube 50, which mandrel is formed by a head 56 of suitable shape provided with four little rollers 57 having a convexed surface and mounted loose on their spindles 58, disposed along the four sides of a square. The object of the mandrel is to press the whole wall of the tube against the rollers 53 and 54 during the sliding movement of the tube. On the rod 55 is adjustably mounted a flanged sleeve 59 which is struck by the tube 50 when this last has completed its travel through the rolling mill, and strikes the end of the curved bar 60. An electrical contact is so established between the two electrodes carried by 59 and 60 respectively, which contact produces a reversing in the turning movement of the rollers 53—54 thereby returning the tube through the rollers for further calibration. Instead of the electrical device a suitable hand or automatically operated mechanical device could be provided to reverse the movement of the rollers 53 and 54.

In the modified form of Fig. 21, the rolling mill is formed by a hinged tube 61 into which the tube 50 is pushed and in the inside of which rotates a mandrel provided with oblique little rollers 57' and carried by the stem 55' rotated by means of the endless screw 62 and worm wheel 63.

The mandrel presses the tube 50 against the tube 61 to which is imparted a forward movement and effects thereby the calibrating of tube 50 itself.

It is understood that the details of construction of the machinery and of the accessory arrangements may be altered in practice from those described and shown, without departing from the scope of the invention.

Now what I claim is:

1. In an electric welding machine, the combination of means for feeding forward a tubular blank, with an electrode assembly comprising a tubular support adapted to enter the tubular blank in axial alinement therewith, a pivotal mounting for the rear end of the tubular support including a connection adapted to enter the tubular blank between the edges of said blank, a roller electrode journaled in the forward end of the tubular support and adapted to enter the tubular blank to bear against the inner edges of said blank, a second roller electrode mounted outside of the tubular blank to engage the outer edges of the tubular blank opposite to the first roller electrode, means connected with the forward end of the tubular support to move the latter on its pivotal mounting to force the roller electrodes together against the edges of the tubular blank, and opposite closing rollers engaging the tubular blank to hold the edges of said blank in abutting relation at the place of contact with the roller electrodes.

2. In electric welding machine, as claimed in claim 1, characterized by the fact that the tubular support is divided longitudinally into supply and discharge passages respectively communicating at their rear ends with supply and discharge ducts adapted to lead between the edges of the tubular blank, and that the roller electrode journaled in the forward end of the tubular support is provided with a shaft having opposite passages leading through its ends into the body of the electrode from the supply and discharge passages respectively in the tubular support, said roller electrode having an annular chamber extending around its periphery and communicating through radial passages with the opposite passages in the ends of the shaft to provide a continuous passage from the supply passage of the tubular support through the electrode to the discharge passage of the tubular support.

ROCCHI, VITTORIO.